(12) United States Patent
Chang

(10) Patent No.: US 7,594,745 B2
(45) Date of Patent: Sep. 29, 2009

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/874,919

(22) Filed: Oct. 19, 2007

(65) Prior Publication Data
US 2009/0010005 A1 Jan. 8, 2009

(30) Foreign Application Priority Data
Jul. 6, 2007 (CN) .................. 2007 1 0201022

(51) Int. Cl.
*F21V 7/04* (2006.01)
(52) U.S. Cl. ...................... 362/625; 362/617
(58) Field of Classification Search ......... 362/600–629, 362/235, 242, 244, 246, 326, 329, 333; 385/146, 385/901; 349/64
See application file for complete search history.

(56) References Cited

U.S. PATENT DOCUMENTS

| | | | | |
|---|---|---|---|---|
| 5,584,556 A | * | 12/1996 | Yokoyama et al. | 362/625 |
| 6,220,736 B1 | * | 4/2001 | Dobler et al. | 362/539 |
| 2007/0086179 A1 | * | 4/2007 | Chen et al. | 362/27 |
| 2008/0055931 A1 | * | 3/2008 | Verstraete et al. | 362/612 |
| 2008/0101086 A1 | * | 5/2008 | Lee | 362/615 |

* cited by examiner

*Primary Examiner*—Jong-Suk (James) Lee
*Assistant Examiner*—Julie A Shallenberger
(74) *Attorney, Agent, or Firm*—Frank R. Niranjan

(57) ABSTRACT

An exemplary optical plate includes at least one transparent plate unit. The transparent plate unit includes a light output surface, a bottom surface, a plurality of enclosing V-shaped protrusions, a plurality of microstructures and at least one lamp-receiving portion. The light output surface is opposite to the bottom surface. The enclosing V-shaped protrusions are formed on the bottom surface. The microstructures are formed on the light output surface. The lamp-receiving portion is defined in the bottom surface. A backlight module using the present optical plate is also provided.

16 Claims, 10 Drawing Sheets

OPTICAL PLATE AND BACKLIGHT MODULE USING THE SAME

CROSS-REFERENCE TO RELATED APPLICATIONS

This application is related to twenty two co-pending U.S. patent applications, which are: application Ser. Nos. 11/835,425, 11/835,426, 11/835,427, 11/835,428, 11/835,429, 11/835,430, and 11/835,431, filed on Aug. 8, 2007, and all entitled "OPTICAL PLATE AND BACKLIGHT MODULE USING THE SAME", application Ser. no. 11/836,799 filed on August 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", applications Ser. No. 11/843,669 and Ser. No. 11/843,670, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", applications Ser. No. 11/845,790, Ser. No. 11/845,792, Ser. No. 11/845,793, and Ser. No. 11/845,794, filed on Aug. 28, 2007, all entitled "OPTICAL PLATE AND BACKLIGHT MODULE USING THE SAME", applications Ser. Nos. 11/850,040 and 11/850,041, filed on Sep. 5, 2007, both entitled "OPTICAL PLATE AND BACKLIGHT MODULE USING THE SAME", application Ser. Nos. 11/8861,310 and 11/861,311, filed on Sep. 26, 2007, both entitled "OPTICAL PLATE AND BACKLIGHT MODULE USING THE SAME", application Ser. No. 11/862,203, filed on September 27, and entitled "OPTICAL PLATE AND BACKLIGHT MODULE USING THE SAME", and application Ser. No. 11/874,918, and entitled "OPTICAL PLATE AND BACKLIGHT MODULE USING THE SAME". In all these co-pending applications excepting application Ser. No. 11/845,790, the inventor is Shao-Han Chang. In application Ser. No. 11/845,790, the inventor is Shao-Han Chang and Fen Chen. All of the co-pending applications have the same assignee as the present application. The disclosures of the above identified applications are incorporated herein by reference.

BACKGROUND OF THE INVENTION

1. Field of the Invention

The present invention relates to an optical plate for use in a backlight module, and the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source to display data images. In the case of a typical liquid crystal display device, a backlight module powered by electricity supplies the needed light.

FIG. 10 represents a typical direct type backlight module 100. The backlight module 100 includes a housing 101, a light reflective plate 102, a light diffusion plate 103, a prism sheet 104, and a plurality of light emitting diodes 105 (hereinafter called LEDs). The housing 101 includes a rectangular base 1011 and four sidewalls 1013 extending around a periphery of the base 1011. The base 1011 and the four sidewalls 1013 cooperatively define a chamber 1017. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 1017. The light reflective plate 102 defines a plurality of through holes (not labeled) that allows the light-emitting portions 1051 of the LEDs 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is outputed from the prism sheet 104.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. As a result, the brightness of the backlight module 100 is still not uniform. One method of enhancing the uniformity of brightness of the backlight module 100 is to increase the space between the light diffusion plate 103 and the LEDs 105. This increase in space tends to eliminate potential dark areas. However, increasing the space between the diffusion plate 103 and the LEDs 105 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes one or more transparent plate units. The transparent plate unit includes a first surface, a second surface, a plurality of enclosing V-shaped protrusions, a plurality of microstructures, and a lamp-receiving portion. The second surface is opposite to the first surface. The enclosing V-shaped protrusions are formed on the first surface. The microstructures are formed on the second surface. Each microstructure comprises at least three side surfaces connected with each other and a transverse width of each side surface decreases along a direction away from the first surface. The lamp-receiving portion is defined in at least one of the first surface and the second surface.

A backlight module according to a preferred embodiment includes a housing, a side-lighting type point light source, an optical plate, and a light diffusion plate. The housing includes a base and a plurality of sidewalls extending from a periphery of the base, the base and the sidewalls cooperatively forming an opening. The point light source is positioned on the base, and has a light-emitting portion and a reflective member positioned on the light-emitting portion. The same optical plate as described in the previous paragraph is employed in this embodiment. The light-emitting portion of the point light source is inserted in the lamp-receiving portion of the optical plate correspondingly. The light diffusion plate is positioned on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe the present optical plate and backlight module, in detail.

Figure 1:
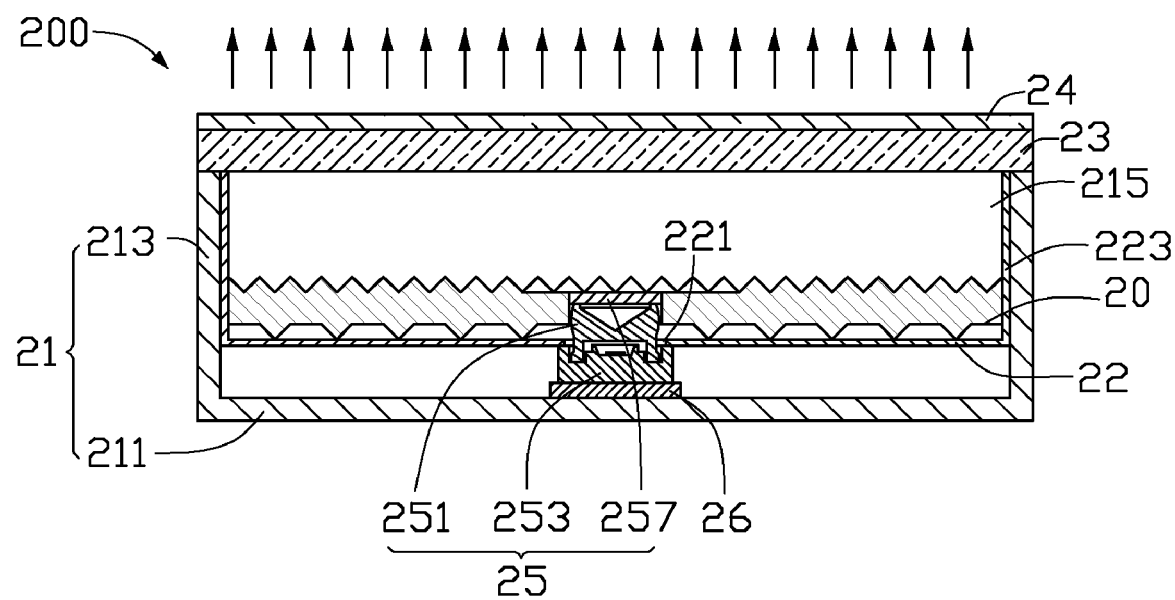
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes a housing 21, a light reflective plate 22, a light diffusion plate 23, a LED 25, and an optical plate 20. The housing 21 includes a rectangular base 211 and four sidewalls 213 extending from a periphery of the base 211, the base 211 and the sidewalls 213 cooperatively forming an opening 215. The optical plate 20, the light reflective plate 22, and the LED 25 are received in the housing 21. The light diffusion plate 23 is positioned on the housing 21 over the opening 215.

Figure 2:
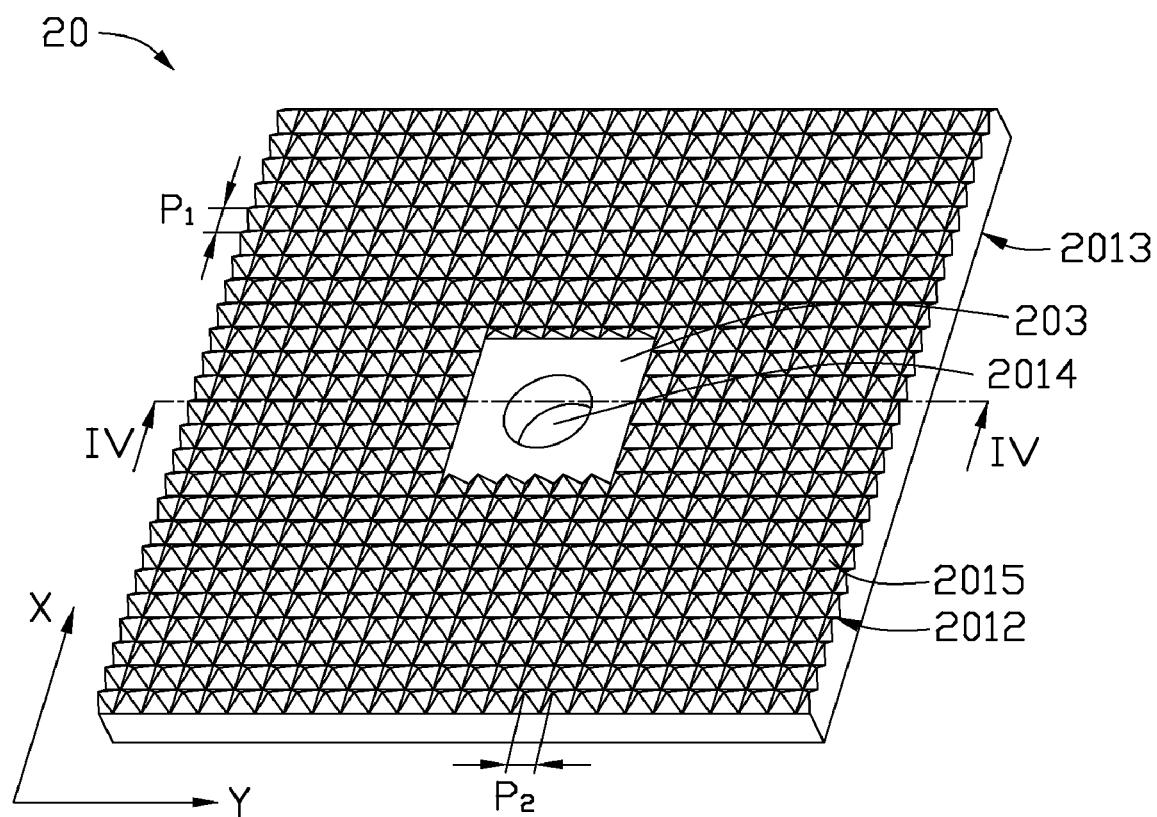
FIG. 2 is an isometric view of the optical plate of FIG. 1.
Figure 3:
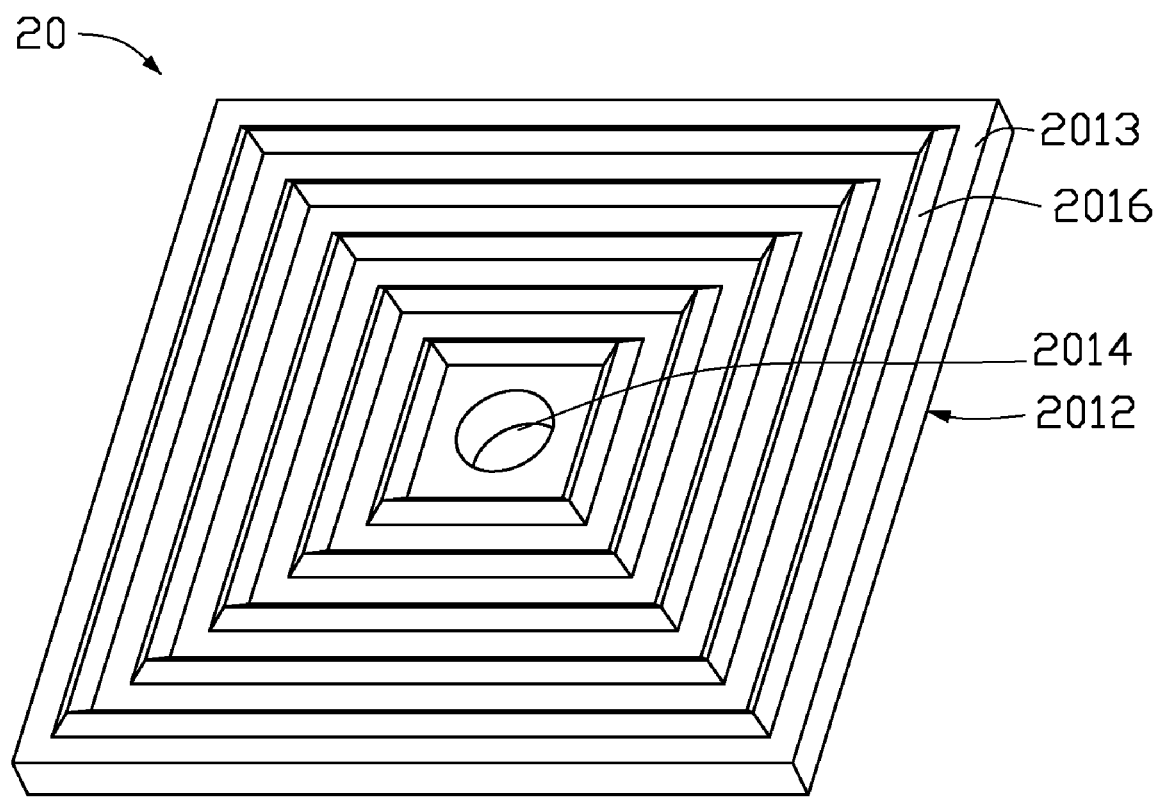
FIG. 3 is similar to FIG. 2, but viewed from another aspect.
Figure 4:
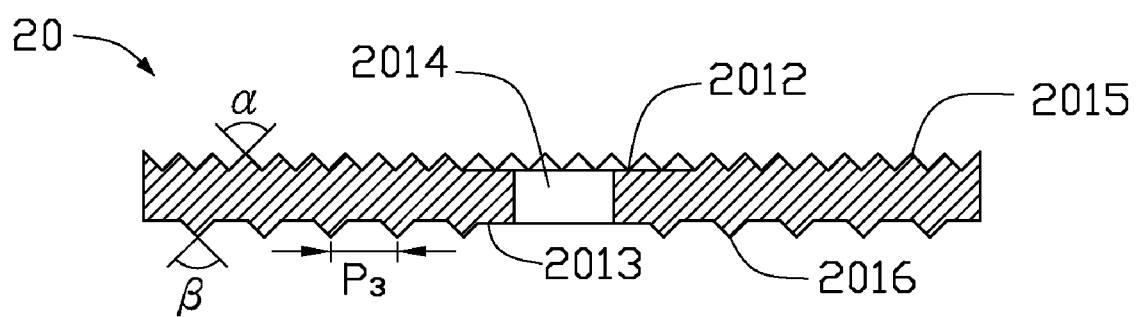
FIG. 4 is a side cross-sectional view taken along line IV-IV of FIG. 2.

Referring to FIGS. 2 through 4, the optical plate 20 is a transparent plate that can be mounted into the housing 21. The optical plate 20 includes a light output surface 2012 (shown in FIG. 2) and a bottom surface 2013 (shown in FIG. 3) on another side of the optical plate 20 opposite to the light output surface 2012. A plurality of microstructures 2015 are formed on the light output surface 2012. A plurality of square protrusions 2016 are formed on the bottom surface 2013. The square protrusion 2016 has a triangular structure on a cross section of a plane. The optical plate 20 further includes a lamp-receiving portion 2014 defined in the bottom surface 2013. The lamp-receiving portion 2014 is defined in a center of the bottom surface 2013 and is a through hole that communicates between the light output surface 2012 and the bottom surface 2013. In the first preferred embodiment, the microstructures 2015 are distributed on the light output surface 2012 surrounding the lamp-receiving portion 2014. Each square protrusion 2016 forms a square wall surrounding the lamp-receiving portion 2014 of the bottom surface 2013. Each of the four sides of the square protrusion 2016 is substantially an elongated prism protruding out of the bottom surface 2013. A center of each of the square protrusion 2016 locates at the lamp-receiving portion 2014. The square protrusions 2016 are parallel to each other and a perimeter of each of the square protrusions 2016 increases with increasing distance from the lamp-receiving portion 2014.

In the first preferred embodiment, the microstructures 2015 are distributed on the light output surface 202 in a matrix manner. Each microstructure 2015 includes four side surfaces (not labeled). A transverse width of each side surface decreasing along a direction away from the light output surface 202. A pitch $P_1$ of adjacent microstructures 2015 along an X-axis direction and a pitch $P_2$ of adjacent microstructures 2015 along Y-axis direction are both configured to be in a range from about 0.025 millimeters to about 2 millimeters. Also referring to FIG. 4, a dihedral angle $\alpha$ defined by two opposite side surfaces of each of the microstructures 2015 is configured to be in a range from about 60 degrees to about 120 degrees. The square protrusions 2016 are arranged at predetermined intervals. Likewise, a pitch $P_3$ of adjacent square protrusions 2016 is configured to be in a range from about 0.025 millimeters to about 2 millimeters. Also referring to FIG. 4, a vertex angle $\beta$ of the triangular of each of the square protrusions 2016 is configured to be in a range from about 60 degrees to about 120 degrees.

The optical plate 20 can be made from material(s) selected from the group consisting of polycarbonate (PC), polymethyl methacrylate (PMMA), polystyrene (PS), copolymer of methylmethacrylate and styrene (MS), and any suitable combination of those. A thickness of the optical plate 20 is preferably in a range from 0.5 millimeters to about 5 millimeters.

Referring to FIG. 1, again, the side-lighting type LED 25 includes a base portion 253, a light-emitting portion 251 positioned on the base portion 253, and a reflective member 257 positioned on the light-emitting portion 251. The LED 25 is electrically connected to a printed circuit board 26 that is fixed to the base 211 of the housing 21. The light-emitting portion 251 of the LED 25 is inserted into the lamp-receiving portion 2014 of the optical plate 20, and the light output surface 2012 of the optical plate 20 faces the light diffusion plate 23. The light reflective plate 22 defines a hole 221 in a base of the light reflective plate 22. The hole 221 correspondes to the lamp-receiving portion 2014 of the optical plate 20. The light reflective plate 22 is positioned underneath the bottom surface 2013 of the optical plate 20 with the light-emitting portion 251 of the LED 25 passing through the through hole 221 of the light reflective plate 22. The light reflective plate 22 and the optical plate 20 are supported by the base portion 253 of the LED 25.

In use, light emitting from the light-emitting portion 251 of the LED 25 enters the optical plate 20 via inner surfaces of the lamp-receiving portions 2014. A significant amount of the light is transmitted through the optical plate 20. Since the surfaces of the square protrusions 2016 are slanted, incident light that may have been internally reflected on flat surface, are refracted out at the slanted surfaces of the square protrusions 2016. As a result, a great amount of light is able to be outputted, from the light output surface 2012, faster.

In addition, the microstructures 2015 can condense and collimate light exiting the light output surface 2012, thereby improving a light illumination brightness. Furthermore, because the side-lighting type LED 25 is positioned in the lamp-receiving portion 2014, light exits the light output surface 2012 uniformly. Light exiting the optical plate 20 can be further substantially mixed in a chamber defined between the optical plate 20 and the light diffusion plate 23 before passing through the light diffusion plate 23 as uniform surface light. A distance from the LED 25 to the light diffusion plate 23 may be configured to be very small, with little or no potential risks of having dark areas on the portion of the backlight module 200 directly above the LED 25. Accordingly, the backlight module 200 can have a thin configuration while still providing good, uniform optical performance.

It should be pointed out that, the light reflective plate 22 can be omitted. In an alternative embodiment, a high reflective film can be deposited on inner surfaces of the base 211 and the sidewalls 213 of the housing 21. In other alternative embodiment, the housing 21 is made of metal materials, and has a high reflective inner surface.

It is to be understood that, in order to improve a brightness of the backlight module 200 within a specific range of viewing angles, the backlight module 200 can further include a prism sheet 24 positioned on the light diffusion plate 23. In addition, in order to improve a light energy utilization rate of the backlight module 200, the light reflective plate 22 can further include four reflective sidewalls 223 extending around a periphery thereof and in contact with the sidewalls 213 of the housing 21.

Figure 5:
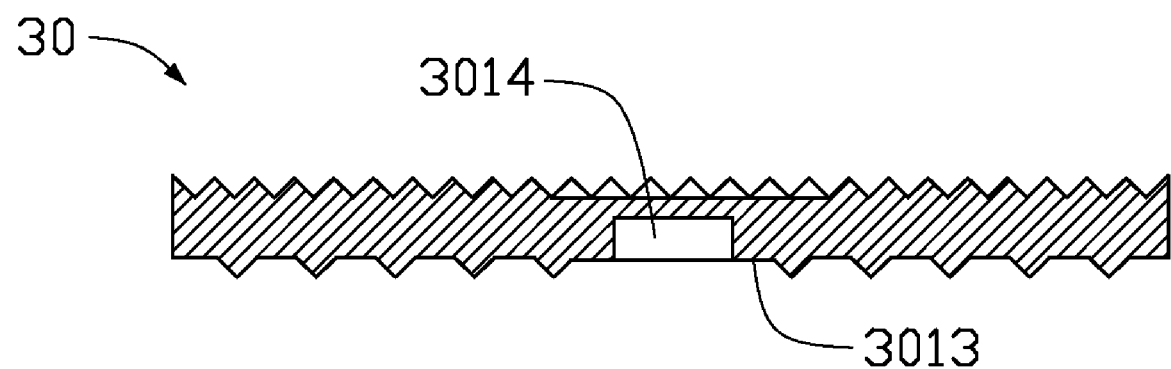
FIG. 5 is a side cross-sectional view of an optical plate according to a second preferred embodiment of the present invention.

Referring to FIG. 5, an optical plate 30 in accordance with a second preferred embodiment is shown. The optical plate 30 is similar in principle to the optical plate 20, except that a lamp-receiving portion 3014 of the optical plate 30 is a blind hole defined in the bottom surface 3013. It should be pointed out that, a reflective layer can be deposited on a center of the optical plate 30 above the lamp-receiving portion 3014. With the reflective layer, a/the reflective member positioned on the light-emitting portion can be omitted.

Figure 6:
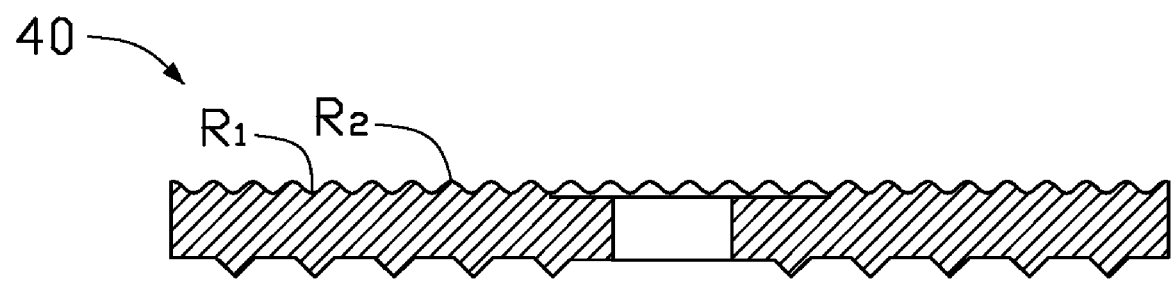
FIG. 6 is a side cross-sectional view of an optical plate according to a third preferred embodiment of the present invention.

Referring to FIG. 6, an optical plate 40 in accordance with a third preferred embodiment is shown. The optical plate 40 is similar in principle to the optical plate 20, except that either top end of each microstructure or a bottom edge defined by the boundary formed by the bases of adjacent microstructures are rounded. The curvature of this rounded surface is defined by a sphere of Radius R. The radius $R_1$ of the rounded top end and the radius $R_2$ of the rounded bottom edge is equal to or less than 1.1 millimeters, and greater than zero. It can be understood that either top edge of each square protrusion or a bottom edge defined by the boundary formed by the bases of adjacent square protrusions can be rounded similarly.

Figure 7:
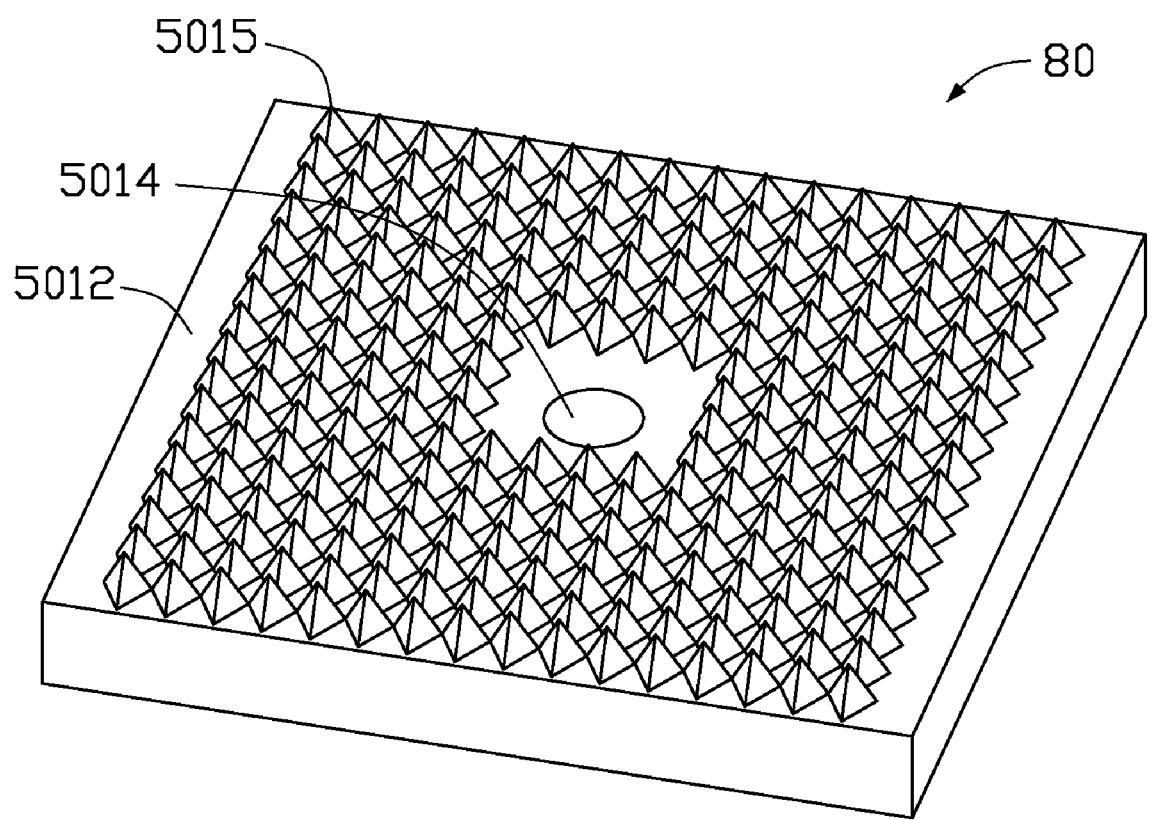
FIG. 7 is an isometric view of the optical plate according to a fourth preferred embodiment of the present invention.

Referring to FIG. 7, an optical plate 50 in accordance with a fourth preferred embodiment is shown. The optical plate 50 is similar in principle to the optical plate 20, a plurality of microstructures 5015 are formed on the light output surface 5012 surrounding a lamp-receiving portion 5014. In the illustrated embodiment, each microstructure is a three-sided (triangular) pyramidal protrusion. It can be understood that each microstructure further can be a five-sided (pentagonal) pyramidal protrusion, multi-sided (polygonal) pyramidal protrusion, or frustum of these.

Figure 8:
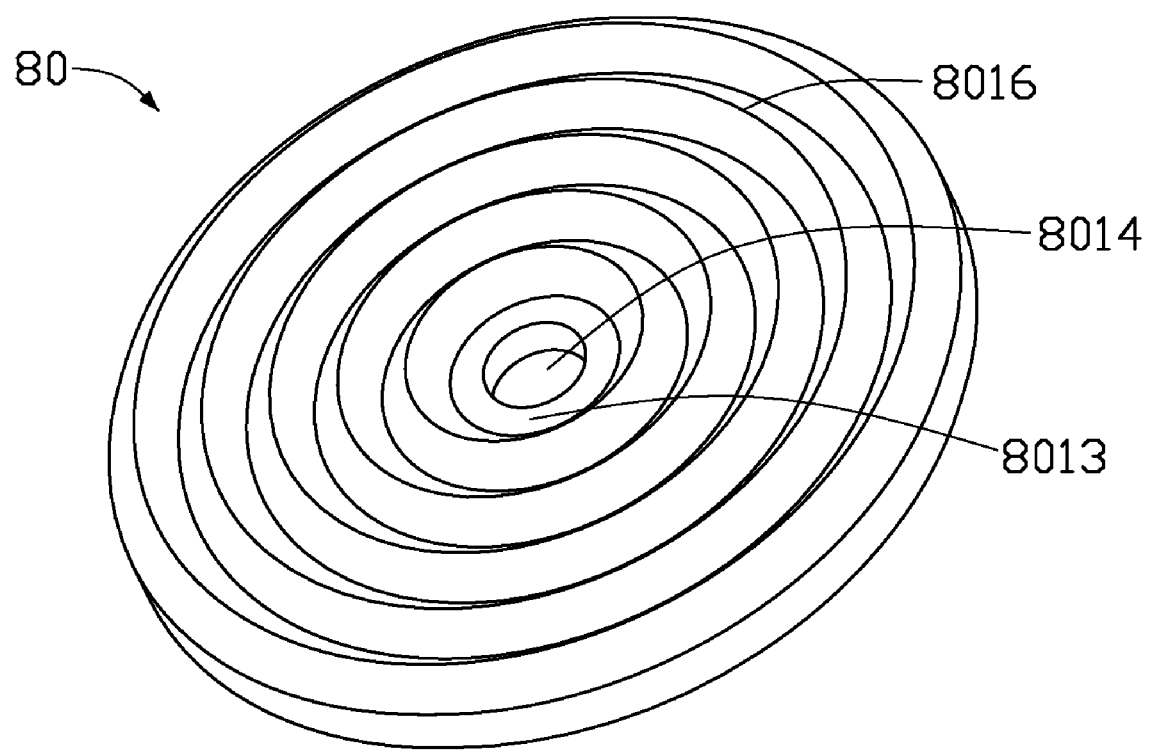
FIG. 8 is an isometric view of the optical plate according to a fifth preferred embodiment of the present invention.

Referring to FIG. 8, an optical plate 80 in accordance with a fifth preferred embodiment is shown. The optical plate 80 is similar in principle to the optical plate 20, a plurality of circular protrusions 8016 are formed on the bottom surface 8013. The square protrusion 8016 has a triangular structure on a cross section of a plane. Each square protrusion 8016 forms a substantially circular wall surrounding a lamp-receiving portion 8014.

Figure 9:
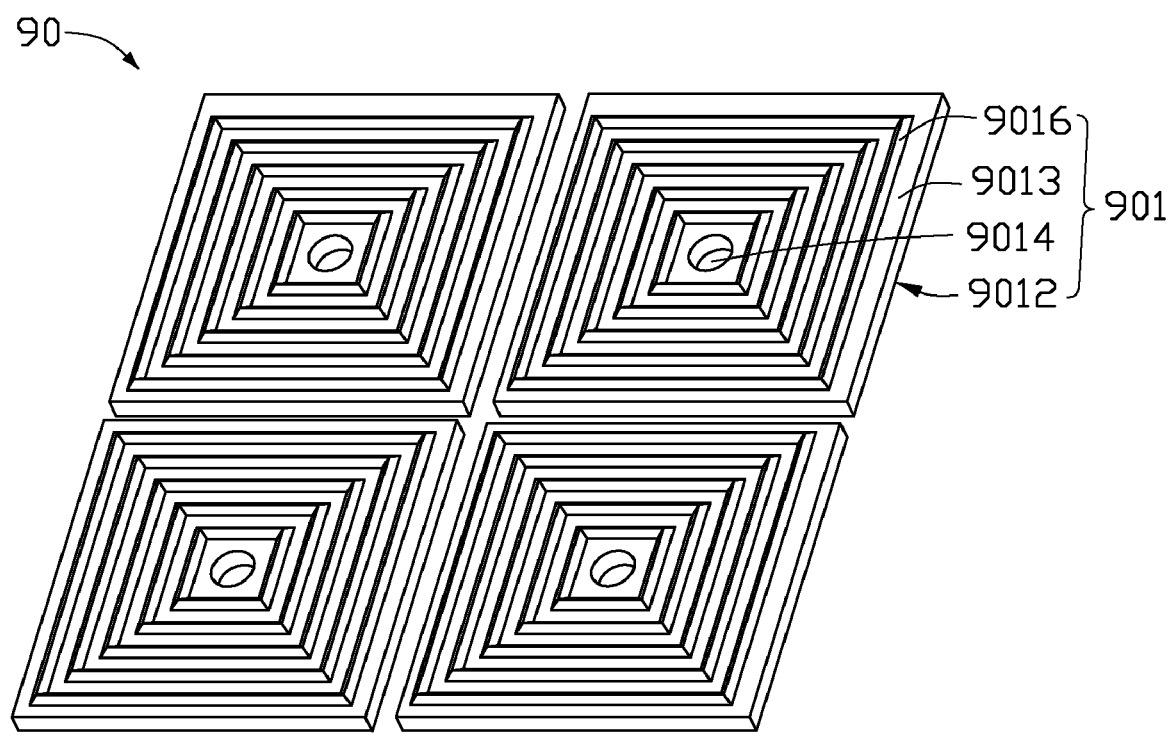
FIG. 9 is an isometric view of the optical plate according to a sixth preferred embodiment of the present invention.
Figure 10:
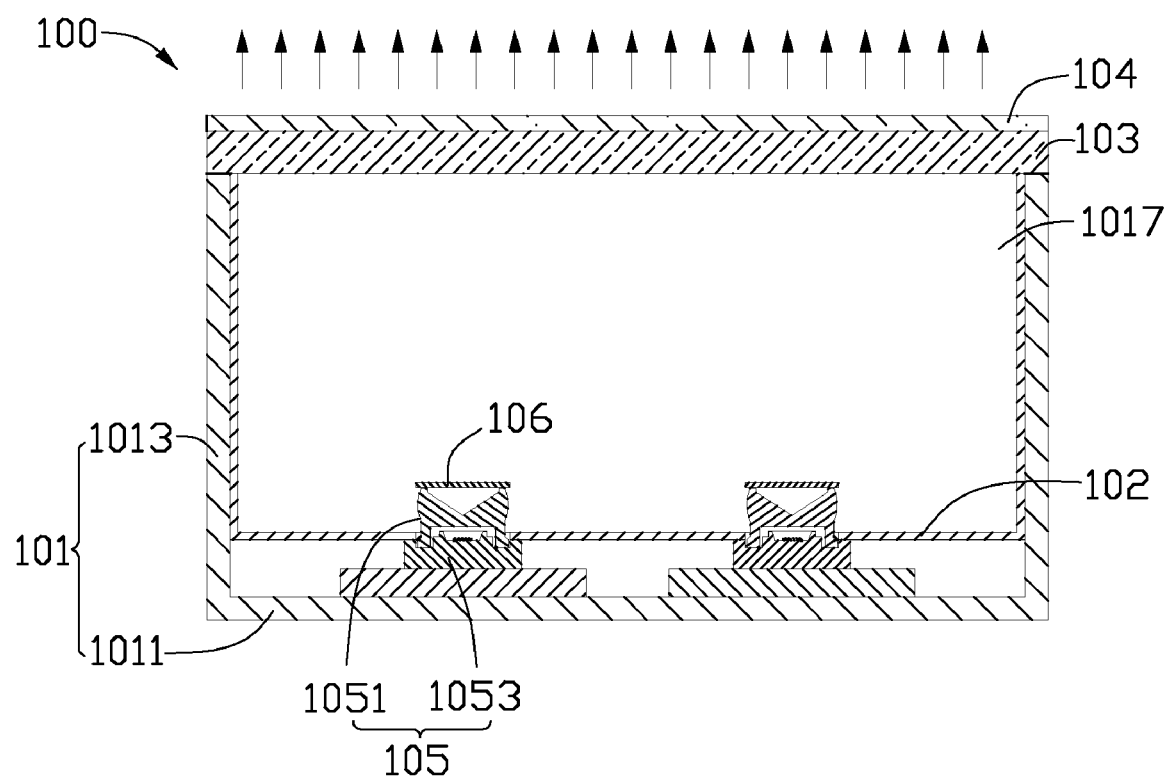
FIG. 10 is a side cross-sectional view of a conventional backlight module.

Referring to FIG. 9, a combined optical plate 90 in accordance with a sixth preferred embodiment is shown. The combined optical plate 90 includes four transparent plate units 901 that can be combined with together. Each transparent plate unit 901 is similar in principle to the optical plate 20. Either microstructures (not shown) formed on light output surface 9012 or square protrusions formed on bottom surface 9013, are similar as those of the optical plate 20. In use, a plurality of side-lighting type LEDs and the combined optical plate 90 can be mounted into a housing to form a larger sized backlight module.

It should be noted that, the backlight module 200 is not limited to be configured with the optical plate 20 positioned in the housing 21 with the light output surface 2012 facing the light diffusion plate 23, but can also be configured with the optical plate 20 positioned in the housing 21 with the bottom surface 2013 facing the light diffusion plate 23. That is, the enclosing V-shaped protrusions 2016 are formed on a first surface of the optical plate 20, and the microstructures 2015 are formed on a second surface of the optical plate 20. The first surface is selected from one of the light output surface 2012 and the bottom surface 2013, and the second surface is selected from the other one of the light output surface 2012 and the bottom surface 2013. However, if a lamp-receiving portion is a blind hole, a surface where the blind hole is defined must be a bottom surface and the other surface must be a light output surface. In addition, the protrusions formed on the light output surface is not limited to be circular protrusions and square protrusions, but can also be other enclosing V-shaped protrusions.

In the backlight module 200, a plurality of red, green, and blue colored LEDs can be inserted into the lamp-receiving portions 2014 of the optical plate 20, such that a blended white surface light can be obtained. It is to be understood that other kinds of point light source, such as field emission lamps and so on, can replace the LED 25 in above mentioned embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of looped V-shaped protrusions formed on the first surface;
   a plurality of microstructures formed on the second surface, wherein each microstructure comprises at least three side surfaces connected with each other, a transverse width of each side surface decreasing along a direction away from the first surface; and
   at least one lamp-receiving portion defined in at least one of the first surface and the second surface, wherein each looped V-shaped protrusion forms a wall surrounding the at least one lamp-receiving portion completely.

2. The optical plate according to claim 1, wherein each of the plurality of the looped V-shaped protrusions forms a substantially square wall surrounding the at least one lamp-receiving portion of the bottom surface.

3. The optical plate according to claim 1, wherein a pitch of the two adjacent looped V-shaped protrusions is in a range from about 0.025 millimeters to about 2 millimeters.

4. The optical plate according to claim 1, wherein a vertex angle of each of the looped V-shaped protrusions is in a range from about 60 degrees to about 120 degrees.

5. The optical plate according to claim 1, wherein the microstructures are selected from a group consisting of triangular pyramidal protrusions, rectangular pyramidal protrusions, pentagonal pyramidal protrusions, polygonal pyramidal protrusions, and frustums of these.

6. The optical plate according to claim 5, wherein the microstructures are rectangular pyramidal protrusions, an dihedral angle defined by two opposite side surfaces of each of the microstructures is configured to be in a range from about 60 degrees to about 120 degrees.

7. The optical plate according to claim 5, wherein the microstructures are rectangular pyramidal protrusions, a pitch of the two adjacent microstructures is configured to be in a range from about 0.025 millimeters to about 2 millimeters.

8. The optical plate according to claim 1, wherein the at least one lamp-receiving portion is selected from one of blind hole and through hole communicating between the first surface and the second surface.

9. The optical plate according to claim 1, wherein the optical plate includes a plurality of the transparent plate units, the transparent plate units being tightly combined with each other.

10. A backlight module comprising:
    a housing having a base and a plurality of sidewalls extending from a periphery of the base, the base and the sidewalls cooperatively forming an opening;
    at least one side-lighting type point light source disposed on the base, each point light source having a light-emitting portion and a reflective member disposed on the light-emitting portion;
    an optical plate positioned in the housing, the optical plate including at least one transparent plate unit having:
    a first surface;
    a second surface opposite to the first surface;
    a plurality of looped V-shaped protrusions formed on the first surface;
    a plurality of microstructures formed on the second surface, wherein each microstructure comprises at least three side surfaces connected with each other, a transverse width of each side surface decreasing along a direction away from the first surface; and
    a lamp-receiving portion defined in at least one of the first surface and the second surface, wherein
    each looped V-shaped protrusion forms a wall surrounding the lamp-receiving completely, and the light-emitting portion of the at least one point light source is inserted in the lamp receiving portion; and
    a light diffusion plate disposed on the housing over the opening.

11. The backlight module according to claim 10, further comprising a light reflective plate defining a through hole therein, the light reflective plate being disposed underneath the bottom surface of the optical plate, and the light emitting portion of the point light source passing through the through hole of light reflective plate correspondingly.

12. The backlight module according to claim 11, wherein the light reflective plate further comprises a plurality of reflective sidewalls extending around a periphery thereof and contacting with the sidewalk of the housing.

13. The backlight module according to claim 10, wherein the housing is made of metal materials, and has high reflectivity inner surface.

14. The backlight module according to claim 10, further comprising a high reflectivity film deposited on inner surfaces of the base and the sidewalls of the housing.

15. The backlight module according to claim 10, further comprising a prism sheet disposed on the light diffusion plate.

16. The backlight module according to claim 10, wherein the lamp-receiving portion is selected from one of blind hole and through hole communicating with the first surface and the second surface.

* * * * *